US007346542B2

United States Patent
Suzuki (10) Patent No.: US 7,346,542 B2
(45) Date of Patent: Mar. 18, 2008

(54) METHOD AND SYSTEM FOR PLANNING EMPLOYEE TRAINING IN COMPANY

(75) Inventor: Hidenori Suzuki, Ota (JP)

(73) Assignee: Fujitsu Limited, Kawasaki (JP)

( * ) Notice: Subject to any disclaimer, the term of this patent is extended or adjusted under 35 U.S.C. 154(b) by 1032 days.

(21) Appl. No.: 09/795,311

(22) Filed: Mar. 1, 2001

(65) Prior Publication Data

US 2002/0062242 A1 May 23, 2002

(30) Foreign Application Priority Data

Nov. 20, 2000 (JP) .............................. 2000-352970

(51) Int. Cl.
G06F 11/34 (2006.01)
(52) U.S. Cl. ........................................ 705/11; 434/107
(58) Field of Classification Search .................... 705/7, 705/9, 11; 434/118, 107
See application file for complete search history.

(56) References Cited

U.S. PATENT DOCUMENTS

| | | | | |
|---|---|---|---|---|
| 5,684,964 A | * | 11/1997 | Powers et al. ................ | 705/11 |
| 5,823,781 A | * | 10/1998 | Hitchcock et al. ........... | 434/118 |
| 5,980,429 A | * | 11/1999 | Nashner ........................ | 482/8 |
| 6,275,812 B1 | * | 8/2001 | Haq et al. ..................... | 705/11 |
| 6,459,787 B2 | * | 10/2002 | McIllwaine et al. ... | 379/265.06 |
| 6,589,055 B2 | * | 7/2003 | Osborne et al. ............ | 434/219 |
| 6,591,246 B1 | * | 7/2003 | Tuttle .......................... | 705/11 |
| 6,857,877 B1 | * | 2/2005 | Watanabe .................... | 434/219 |

FOREIGN PATENT DOCUMENTS

JP 02072483 A * 3/1990

OTHER PUBLICATIONS

Caudron "Training Helps United Global", Feb. 1992; Personal Journal vol. 71, Iss. 2; p. 103, 3pgs, retrieved fron Proquest Direct.*
Proquest "Evaluating an Employee Performance"; Apr. 1991; SuperVision: Burlington. vol. 52, Iss. 4; p. 17, 3pgs.*
Melvin "The Refined Performance Evaluation Monitoring System; Best of Both Worlds", Jan. 1980, Personal Journal, vol. 59 Issue 1. p. 1.*
""P & Q Review!" Getting started Guide, Productivity and Quality Perfoormance Evaluation"; Jun. 1995, Version 2, pp. 1-69.*

(Continued)

Primary Examiner—Romain Jeanty
(74) Attorney, Agent, or Firm—Staas & Halsey LLP (57) ABSTRACT

A method and system for planning of employee training based on the current skill possession status of the company and the company strategy is provided. A company evaluation value concerning the number of employees in the company who have a skill equal to or higher than a predetermined level in a field selected by the company is compared with a reference evaluation value in the selected field. Upon the company evaluation value being lower than the reference evaluation value, a number of employees needed to have a skill equal to or greater than the predetermed level, in order to make the company evaluation value equal to or greater than the reference evaluation value is calculated. Thus, it is possible to comprehend the needs of employee training in accordance with actual status of the company and the company strategy.

6 Claims, 5 Drawing Sheets

OTHER PUBLICATIONS

L, Marcia "Use your head when identifying skills gaps", Mar. 2000, Workforce v79n3, pp. 118-122, Diaog file 15, Accession No. 01995127.*

Keith "Providing the effectiveness of trining", Jan. 1998, Human Resource Management International Digest v6n1 pp. 34-35.*

* cited by examiner

Fig.1

| Size \ Business style | Independent type | User type |
|---|---|---|
| Large company class | A | D |
| | B | E |
| | C | F |
| | ⋮ | ⋮ |
| Middle company class | G | I |
| | H | J |
| | ⋮ | ⋮ |
| Small company class | K | M |
| | L | N |
| | ⋮ | ⋮ |

Fig.2

Company A

| Section name (code) | Employee code | Employee name | Skill level ||||  |
|---|---|---|---|---|---|---|---|
| | | | Web | Security | DB | UNIX | - - - - |
| | | | | | | | |
| | | | | | | | |
| | | | | | | | |
| | | | | | | | |
| | | | | | | | |
| | | | | | | | |
| | | | | | | | |
| | | | | | | | |

Fig.4

| Skill field | Average ratio for other companies | Top company ratio |
|---|---|---|
| Web technology | | |
| Security technology | | |
| DB technology | | |
| UNIX technology | | |
| Java technology | | |
| ⋮ | ⋮ | ⋮ |

Company A

| | The number of employees at each skill level | | | | | High level employee number | High level company ratio |
|---|---|---|---|---|---|---|---|
| | 1 | 2 | 3 | 4 | 5 | | |
| Web technology | | | | | | | |
| Security technology | | | | | | | |
| DB technology | | | | | | | |
| UNIX technology | | | | | | | |
| Java technology | | | | | | | |
| --- | | | | | | | |

Fig.7

| | Company A (165 employees) | | Weight | Average ratio for other companies (%) | Top company ratio (%) | Ratio difference (%) | Deficiency employee number |
|---|---|---|---|---|---|---|---|
| | High level employee number | High level company ratio | | | | | |
| Web technology | 30 | 18.2 | A | 19.5 | 28.1 | 9.9 | 17 |
| Security technology | 24 | 14.5 | C | 16.3 | 22.5 | — | — |
| DB technology | 18 | 10.9 | B | 8.1 | 17.2 | — | — |
| UNIX technology | 28 | 16.9 | A | 14.0 | 16.9 | — | — |
| Java technology | 6 | 3.6 | B | 5.8 | 9.7 | 2.2 | 4 |
| --- | | | | | | | |

Fig.5

List of training applicable candidates

|  | Section name (code) | Employee code | name |
|---|---|---|---|
| Web technology | A100 | 0010 | A |
| | A101 | 0017 | B |
| | A102 | 0038 | C |
| | A103 | 0019 | D |
| | A104 | 0097 | E |
| | A105 | 0062 | F |
| | A106 | 0028 | G |
| | A107 | 0077 | H |
| | A108 | 0024 | I |
| | A109 | 0033 | J |
| | A110 | 0056 | K |
| | A111 | 0035 | L |
| | A112 | 0047 | M |
| | A113 | 0063 | N |
| | A114 | 0049 | O |
| | A115 | 0053 | P |
| | A116 | 0087 | Q |
| Java technology | C001 | 0040 | R |
| | C102 | 0050 | X |
| | C104 | 0070 | Y |
| | C205 | 1001 | Z |

Fig.8

METHOD AND SYSTEM FOR PLANNING EMPLOYEE TRAINING IN COMPANY

TECHNICAL FIELD OF THE INVENTION

This invention relates to information processing technology regarding the planning of the employee training in the company.

BACKGROUND OF THE INVENTION

Conventionally, the planning of the in-house employee training was performed based on intuitions or experiences of a person who was in charge of the employee training in the company, or intention of each employee or each workplace. Therefore, the planning and execution of the employee training, which follows the possession status of the skill in the company and the company strategy were not performed.

SUMMARY OF THE INVENTION

The object of the present invention is to provide technology that enables to plan the employee training based on the current skill possession status and the company strategy.

A method of the first aspect of the present invention for performing a planning for an employee training in an company comprises the steps of: comparing a company evaluation value concerning the number of the employees who have a skill equal to or higher than a predetermined level (for example, the number of the employees who have a skill equal to or higher than a predetermined level, the ratio of the number of employees who have a skill equal to or higher than a predetermined level for the number of all employees in the company, if there are some levels equal to or higher than the predetermined level, the sum of the products of the point, which is set at each level equal to or higher than the predetermined level, and the number of the employees who have the skill at that level, or the sum/(the number of all employees in the company), etc.) in a field selected by the company (for example, important technology field. However, both cases are included in the present invention, in which the fields are specifically selected, and in which the fields are indirectly selected because a degree of its importance is relatively high.); and if the company evaluation value is lower than the reference evaluation value, calculating and storing in a storage device, the number of employees who need to have the skill equal to or higher than a predetermined level in order to make the company evaluation value equal to or higher than the reference evaluation value (also called as the deficiency number of employees, or deficiency employee number).

As described above, for each field selected by the company, for example, the field that is important in the company strategy, the present invention enables to calculate the deficiency number of employees who have that skill. In addition, the company can grasp the scale of the employee training along its actual status and strategy. Furthermore, the selection of training applicable candidates can also be performed based on this deficiency number of employees.

In addition, the first aspect of the present invention may comprise a step of determining the reference evaluation value based on weight information designated to the field selected by the company. For example, as for the extreme important field, higher reference evaluation value (for example, a value at a level equal to or higher than the skill level of the top company in its business world) may be set. As for the next important field, a little high reference evaluation value (for example, a level equal to or higher than the skill level of the business world average) may be set.

Furthermore, the first aspect of the present invention may comprise a step of extracting and storing in the storage device, training applicable candidates based on the deficiency number of employees who have a skill equal to or higher than the predetermined level. As a result, the company can carry out employee training easily because it can get the information of the training applicable candidates.

In the present invention, it is possible to configure a second aspect in which, for example, a server which performs the above-described processing and one or a plurality of the client terminal in the company are connected to a network such as Internet, and the company client terminal acquires company employee training information from the server. In other words, a company employee training information acquisition method in the company client terminal comprises the steps of: transmitting to the server, designation information (Both cases are included in the present invention, in which the field is specifically selected, and in which the field is indirectly selected because a degree of its importance is relatively high.) of a skill field associated with a business of the company; and if a company evaluation value concerning the number of the employees in the company, who have a skill equal to or higher than a predetermined level in the designated skill field, is lower than a reference evaluation value concerning the number of the employees who have a skill equal to or higher than a predetermined level in the designated skill field, receiving from the server and displaying information concerning the number of employees who need to have the skill equal to or higher than a predetermined level in order to make the company evaluation value equal to or higher than the reference evaluation value.

In addition, it is possible to configure the second aspect of the present invention so as to comprise a step of, if the company evaluation value concerning the number of the employees in the company, who have a skill equal to or higher than a predetermined level in the designated skill field, is lower than the reference evaluation value in the designated skill field, receiving from the server and displaying information concerning training applicable employees to be trained.

A method for performing a planning for an employee training in a company can be implemented by a program executed on an ordinary computer, which is a system for performing a planning for an employee training in a company. In this case, the program is stored on a storage medium, such as a floppy disk, a CD-ROM or a magneto-optical disk, or in a storage device, such as a semiconductor memory or a hard disk, while the intermediate processing results are temporarily stored in the memory.

DETAIL DESCRIPTION OF THE PREFERRED EMBODIMENTS

Figure 1:
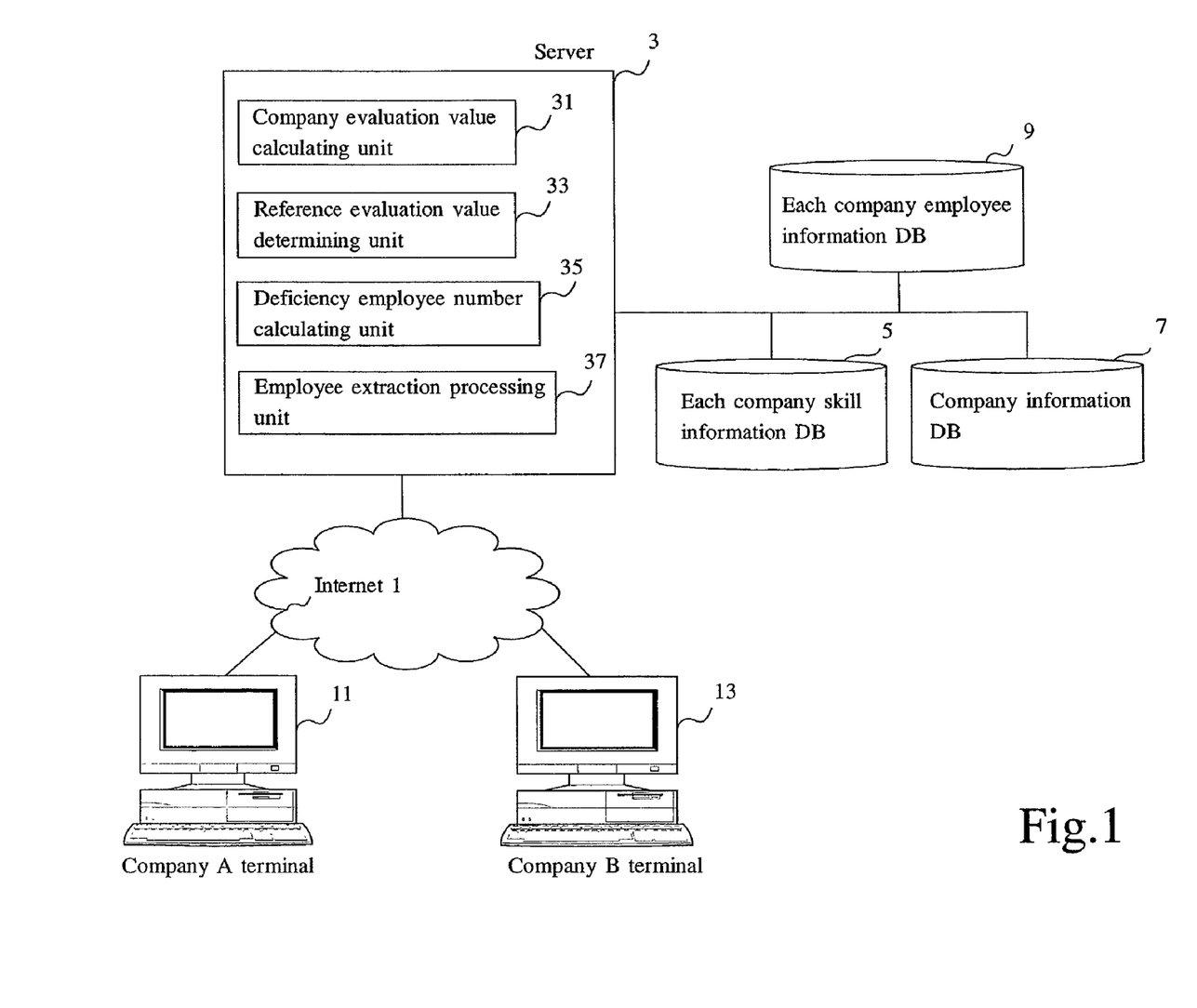
FIG. 1 is a diagram showing the outline of the system in an embodiment of the present invention.

FIG. 1 shows an outline of a system of an embodiment of the present invention. The Internet 1, which is an example of a computer network, interconnects a server 3, which performs the main processing in this embodiment and has, for example, the web server function, a company A terminal 11, which is placed in the company A and has the web browser function, and a company B terminal 13, which is placed in the company B and has the web browser function. Other computers are connected with the Internet 1, however, they are not shown. In addition, the number of the terminals that access to the server 5 is not limited to 2, it may be more than 2 or less than 2. The number of companies is not also limited.

The server 5 includes a company evaluation value calculating unit 31, a reference evaluation value determining unit 33, a deficiency employee number calculating unit 35, and an employee extraction processing unit 37. The company evaluation value calculating unit 31 calculates an evaluation value concerning a skill possession status of a company, which is derived from a skill held by each employee who belongs to the company. For example, the evaluation value is the ratio of employees who have a skill equal to or higher than a predetermined level. Hereinafter, the evaluation value is called as company evaluation value. The reference evaluation value determining unit 33 determines, for each skill field, a reference evaluation value, which is compared with the company evaluation value, based on, for example, a weight value of the skill field designated by the company. The deficiency employee number calculating unit 35 compares, for each skill field, the company evaluation value with the reference evaluation value. If the company evaluation value is lower than the reference evaluation value, it calculates the number of employees who need to have a skill equal to or higher than a predetermined level in order to make the company evaluation value equal to or higher than the reference evaluation value. The employee extraction processing unit 37 extracts concrete employee names based on the deficiency number of employees. In addition, the server 3 manages an each company skill information DB 5, which stores information concerning skill possession status for each company, an each company employee information DB 9, which stores concerning skill possession status of each employee for each company, and a company information DB 7, which stores information concerning companies.

Figure 2:
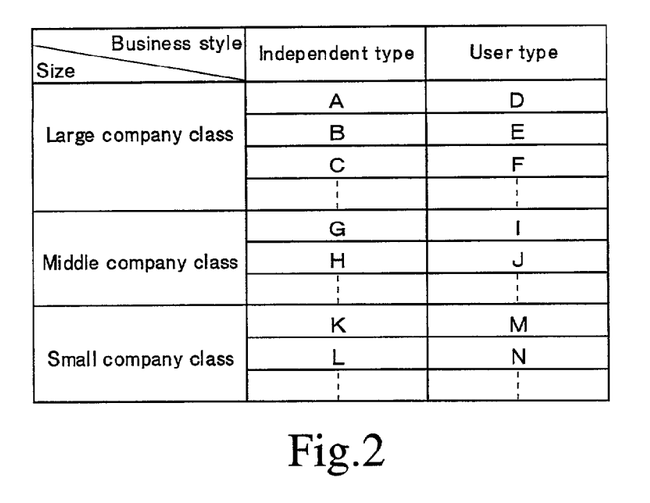
FIG. 2 is a table showing an example of data stored in the company information database (DB)

Next, an example of information stored in the company information DB 7 is explained using FIG. 2. In this embodiment, each company is classified by the size and the business style. The size classification includes a large company class, a middle company class, and a small company class. The business style classification includes an independent type class (if the company and its customers do not belong to a specific company group.) and a user type class (for example, the company mainly works for its parent company.), for example. This is because it is considered that there are many cases in which necessary skill fields or kinds are different according to the size and business style. However, the classification does not have to be performed. In addition, other company classification method may be employed. In an example of FIG. 2, company A, B, and C are classified into the independent type class and the large company class. Company D, E, and F are classified into the user type class and the large company class. Company G and H are classified into the independent type class and the middle company class. Company I and J are classified into the user type class and the middle company class. Company K and L are classified into the independent type class and the small company class. Company M and N are classified into the user type class and the small company class. The company information DB 7 further stores basic information for each company, for example, the number of employees in the company.

Figures 3, 7:
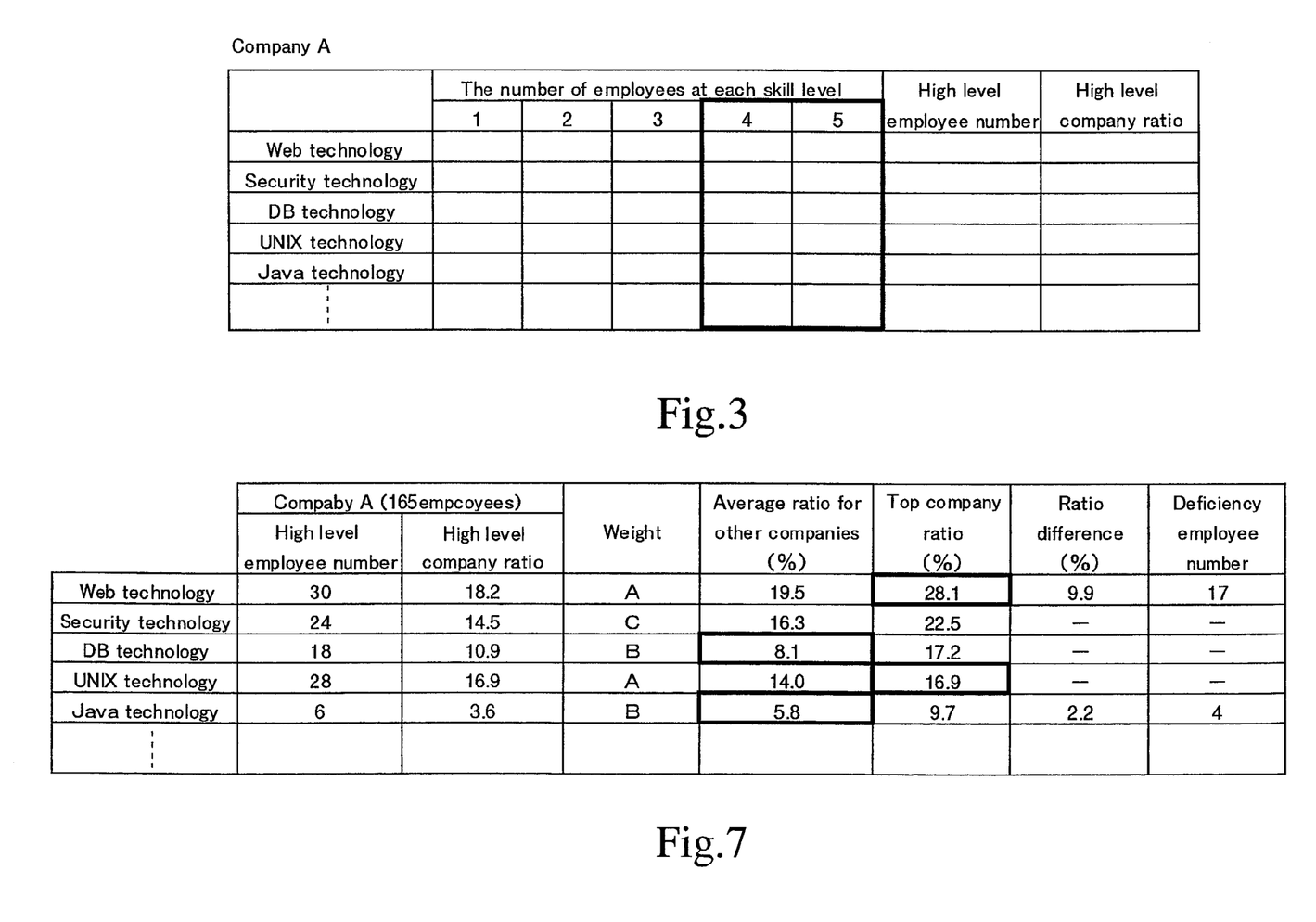
FIG. 3 is a table showing an example of data stored in the each company skill information DB.
FIG. 7 is a first table used to explain an example.

An example of information stored in the each company skill information DB 5 is explained using FIG. 3. In FIG. 3, skill information concerning company A is represented. In an example of FIG. 3, for each predetermined skill field, the number of employees at each skill level of, for example, 5 levels (5 is highest level, and 1 is lowest level), the total number of employees who have a high level skill, in this example, a skill at the skill level 4 and 5 (portion surrounded by a thick line), the ratio of employees who have a high level skill for all employees in the company. The total number of employees who have a high level skill is hereinafter referred to as a high level employee number. The ratio of employees who have a high level skill for all employees in the company is calculated by (high level employee number/the number of all employees in the company) and hereinafter referred to as a high level company ratio. In an example of FIG. 3, the column of the skill fields includes web technology, security technology, DB technology, UNIX technology, Java (a trademark of Sun Microsystems Inc.) technology, and etc. These skill fields are not fixed, and reviewed for each predetermined period according to the development of the technology.

In this embodiment, the skill level 1 represents a level for a person who does not have any knowledge and experience. The skill level 2 represents a level for a person who can perform jobs if the particular and specific instructions are given. The skill level 3 represents a level for a person who can perform jobs if only the point is instructed. The skill level 4 represents a level for a person who has a high level specialty skill and can accomplish the business as a main staff. The skill level 5 represents a level for a person who has a top level skill in the specialty field and can instruct and train other persons. This level classification is one example, and it is possible to define other level classification. In addition, 5, which is the number of level stages, is also one example, and more or less number of level stages can be used for the level classification.

Generally, what is important for the company is the number of employees who have a high level specialty skill and the number of employees who have capability equal to or lower than the normal level is not mentioned. The average value for each skill field is not suitable to represent the skill possession status of the company because values for the high skill level persons are cancelled by values for the low skill level persons. Therefore, in this embodiment, the number of employees who have a high level skill, that is the total number of employees who have a skill at level 4 and higher, is calculated. In addition, the ratio of employees who have a skill at level 4 and higher for all employees in the company is calculated in order to normalize the difference of the employee numbers between the companies. As the company evaluation value, the total number of employees who have a skill at level 4 and higher may be used in a case, and the ratio of employees who have a skill at level 4 and higher for all employees in the company may be used in another case. The company evaluation value calculating unit 31 may calculate the company evaluation value whenever it is necessary, or may calculate in advance, the company evaluation value for each skill field and for each company.

Figure 4:
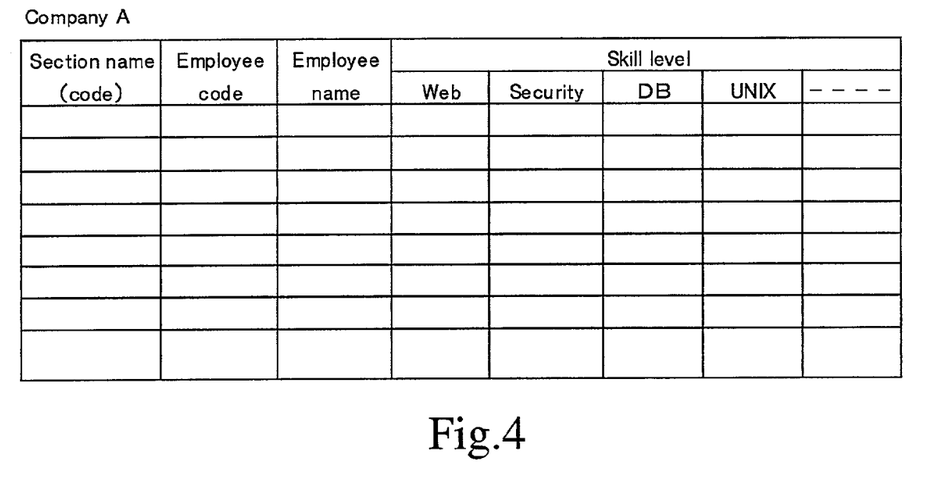
FIG. 4 is a table showing an example of data stored in the each company employee information DB.

An example of information stored in the each company employee information DB 9 is explained using FIG. 4. In FIG. 4, employee information concerning company A is represented. In an example of FIG. 4, for each employee, a section name (section code), an employee code, an employee name, and a skill level value for each skill field are stored. It is possible to configure to transmit information shown in FIG. 4 from, for example, a company terminal to the server 3 via the network 1 and store the information into the each company employee information DB 9. It is also possible to configure, for example, to access to, for example, the server 3 by each employee operating a terminal, acquire information shown in FIG. 4 from the each employee by the online examinations provided from the server 3, and store the information into the each company employee information DB 9.

Figure 5:
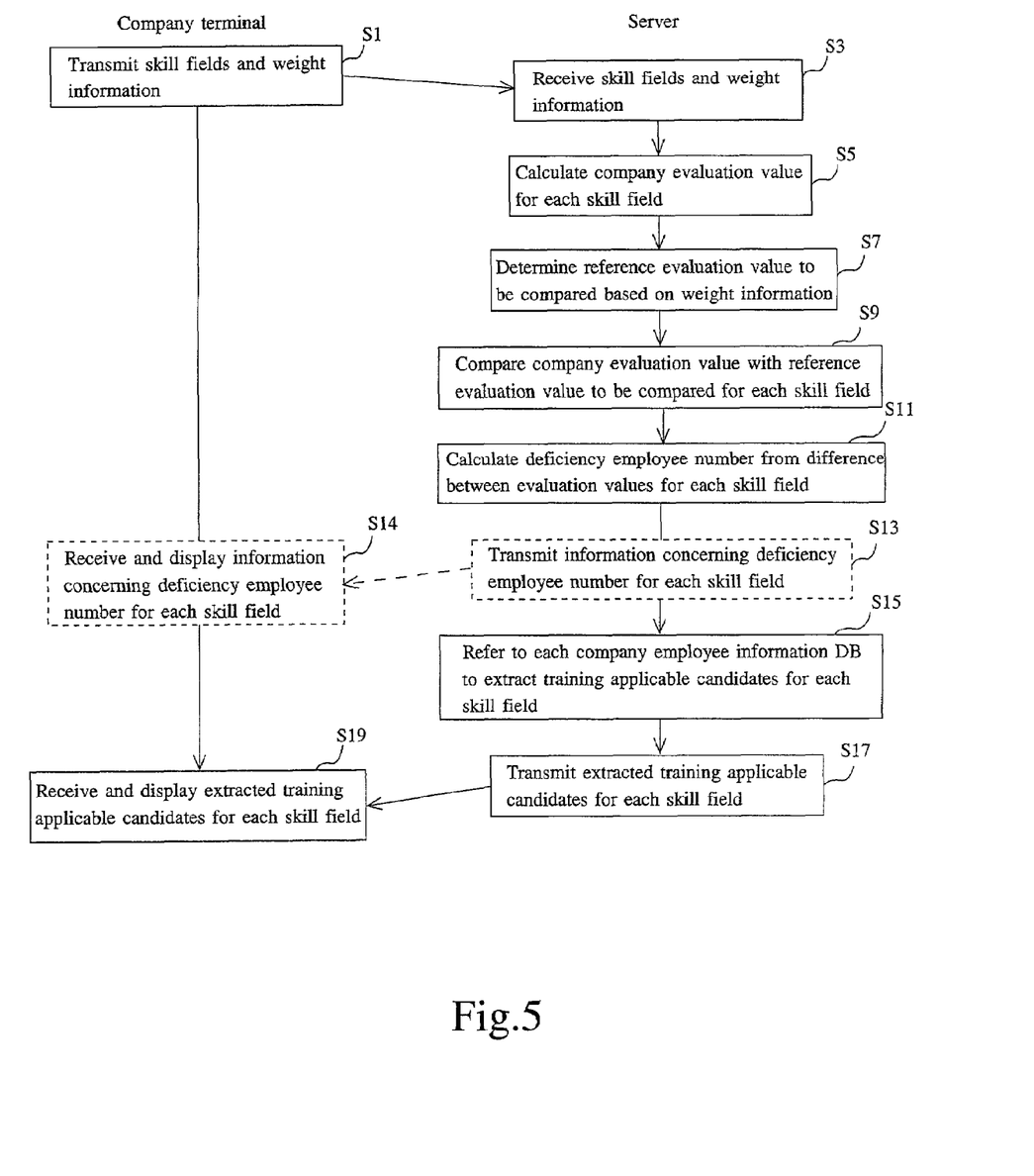
FIG. 5 is a flowchart in the embodiment of the present invention.

Next, a processing flow of the system shown in FIG. 1 is explained using a FIG. 5. Firstly, a person who is in charge of the employee training in the company, for example, operates a company terminal (for example, the company A terminal 11) and causes the company terminal to transmit the skill fields and their weight information (step S1). For example, A is assigned to the most important skill fields in all preset skill fields, B is assigned to the important skill fields, and C is assigned to the normal skill fields. Then, pairs of the skill fields and their weight values are transmitted to the server 3. It is possible to configure to select the most important skill fields and the important skill fields in all preset skill fields and transmit a list of the most important skill fields and a list of the important skill fields.

The most important skill field is selected from the viewpoint of becoming a top company in the skill field. The important skill fields are selected from the viewpoint of becoming a company equal to or higher than an average in the skill field. It is possible to select from the viewpoint of becoming a top company or a company equal to or higher than an average in the skill field in a classification (segment) based on the size and/or business style of the company. In this embodiment, the normal skill fields are not processed.

Next, the server 3 receives and stores into a storage device, the skill fields and weight information from the company A terminal 11 (step S3). Then, as to the company, the company evaluation value calculating unit 31 in the server 3 calculates and stores into the each company skill information DB 5, the evaluation value for each skill fields (for example, high level company ratio) (step S5). As described above, this step may be performed before this processing flow and stored in the each company skill information DB 5. In addition, the high level company ratio may be replaced with the high level employee number. As described above, as to only the most important skill fields and the important skill fields, the calculation at the step S5 is performed. However, it is possible to perform the calculation for the normal skill fields.

Then, the reference evaluation value determining unit 33 determines reference evaluation values to be compared based on the weight information for each skill fields (step S7). For example, as to the most important skill fields, the company evaluation value (the high level company ratio or the high level employee number) of the top company in a segment specified by the size and/or business style, to which the company belong, is determined as a comparison object, and is calculated. In some cases, the company evaluation values are calculated for all companies, and which value is for the top company is determined. In addition, as to the important skill fields, the average evaluation value in a segment (for example, specified by the size and/or business style), to which the company belongs, is determined as a comparison object, and the average evaluation value (or average value for other companies) is calculated. As described above, as to the normal skill fields, the comparison object is not determined. Thus, the reference evaluation, which is a comparison object, is changed according to the weight information of each skill field.

Figure 6:
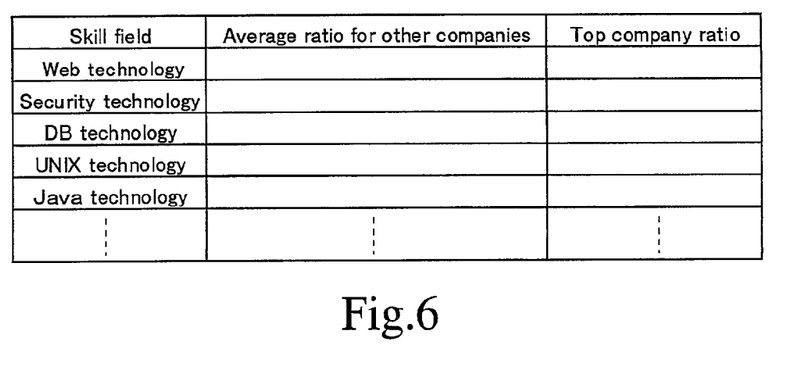
FIG. 6 is a table showing an example of additional data stored in the each company skill information DB.

If information shown in FIG. 6 is stored in the each company skill information DB 5, for example, for each segment by the size and/or business style, the processing in step S7 becomes simple. Namely, for each skill field, an average value of the high level company ratios for other companies (or an average value of the high level employee numbers for other companies) and the high level company ratio for the top company (or the high level employee number for the top company) are calculated in advance, and stored. Then, the reference evaluation value determining unit 33 merely reads out from the table shown in FIG. 6, the average value of the high level company ratios for other companies or the value of the high level company ratio for the top company according to the weight information.

Next, the deficiency employee number calculating unit 35 compares for each skill field, the company evaluation value (the high level company ratio or high level employee number) with the reference evaluation value which is a comparison object determined at step S7 (step S9). In this embodiment, as to the most important skill fields, if the company is already the top company in the segment to which the company belongs, the following processing is not performed. As to the important skill fields, if the company evaluation value is equal to or higher than the average evaluation value in the segment to which the company belongs, the following processing is not performed. Because the object is achieved, the priority of the skill level is automatically lowered, and then skill levels of other skill fields have to be increased.

If the company evaluation value is lower than the reference evaluation value (the evaluation value of comparison object), the deficiency employee number calculating unit 35 calculates the deficiency employee numbers for the skill fields in which the company evaluation value is lower, from the difference of the evaluation values, and stores it into the storage device (step S11).

For example, if the high level company ratio is used as the company evaluation value and it is the most important skill field, the difference between the high level company ratio for the company to be processed and the high level company ratio for the top company, which is the reference evaluation value, is calculated, and the difference of the ratios is multiplied by the total employee number of the company to be processed, then the deficiency employee number is obtained. If the high level company ratio for the company to be processed becomes same as the high level company ratio for the top company, the difference between the high level company ratio for the company to be processed and the high level company ratio for the top company is merely covered. Therefore, for example, it is possible to calculate the difference between a ratio calculated by adding a predetermined value to the high level company ratio for the top company and the high level company ratio for the company to be processed and to multiply the difference of the ratios by the total employee number of the company to be processed. It is also possible to add the pure difference of the ratios and a predetermined value and to multiply the added difference of the ratios by the total employee number of the company to be processed and to obtain the deficiency employee number.

In addition, if the high level company ratio is used as the company evaluation value and it is the important skill field, the difference between the high level company ratio for the company to be processed and the average of the high level company ratios for other companies, which is the reference evaluation value, is calculated, and the difference of the ratios is multiplied by the total employee number of the company to be processed, then the deficiency employee number is obtained. Because the high level company ratio for the company to be processed becomes same as the average of the high level company ratios for other companies if the difference between the high level company ratio for the company to be processed and the average value of the high level company ratios for other companies is merely covered. Therefore, for example, it is possible to calculate the difference between a ratio calculated by adding a predetermined value to the average of the high level company ratios for other companies and the high level company ratio for the company to be processed and to multiply the difference of the ratios by the total employee number of the company to be processed. It is also possible to add the pure difference of the ratios and a predetermined value and to multiply the added difference of the ratios by the total employee number of the company to be processed and to obtain the deficiency employee number.

For example, if the high level employee number is used as the company evaluation value and it is the most important skill field, the difference between the high level employee number for the company to be processed and the high level employee number for the top company, which is the reference evaluation value, is calculated, then the deficiency employee number is obtained. If the high level employee number for the company to be processed becomes same as the high level employee number for the top company, the difference between the high level employee number for the company to be processed and the high level employee number for the top company is merely covered. Therefore, for example, it is possible to add the pure difference and a predetermined value (for example, one) and to obtain the deficiency employee number. It is also possible to round up the difference and/or the result of the addition to the integer.

In addition, if the high level employee number is used as the company evaluation value and it is the important skill field, the difference between the high level employee number for the company to be processed and the average of the high level employee number for other companies, which is the reference evaluation value, is calculated, then the deficiency employee number is obtained. If the high level employee number for the company to be processed becomes same as the average of the high level employee number for other companies, the difference between the high level employee number for the company to be processed and the average value of the high level employee number for other companies is merely covered. Therefore, for example, it is possible to add the pure difference and a predetermined value (for example, one) and to obtain the deficiency employee number. It is also possible round up the difference and/or the result of the addition to the integer.

Then, if the company evaluation value is lower the reference evaluation value (evaluation value of the comparison object), the server 3 transmits information concerning the deficiency employee number for each skill field, whose company evaluation value is lower than the reference evaluation value to the company terminal (for example, the company A terminal 11) (step S13). This step is, for example, performed if only the deficiency employee number is necessary in the company, or if the each company employee information DB 9 does not store information for each employee in the company. If the step S13 has been performed, the company A terminal 11 receives and display on the display device, the information concerning the deficiency employee number for each skill field, whose company evaluation value is lower than the reference evaluation value (step S14). With this, the person, who is in charge of the employee training in the company A, can obtain information to perform the training along with the current skill possession status of the company and the company strategy. For example, the person, who is in charge of the employee training, performs operations for extracting employees to be trained to fulfill the deficiency employee number by using the database in the company and etc. Or the person who is in charge of the employee training asks each section for participation of the employee training by the deficiency employee number.

In addition, the employee extraction processing unit 37 of the server 3 refers to the each company employee information DB 9, and extracts and stores into the storage device, training applicable candidates by the deficiency employee number for each skill field whose company evaluation value is lower than the reference evaluation value (step S15). In this embodiment, the employee at the skill level 3 is extracted by the deficiency employee number from the each company employee information DB 9, and stored as the training applicable candidates into the storage device. If the deficiency employee number is not fulfilled only by the employee at the skill level 3, the employee at the skill level 2 is extracted and stored as the training applicable candidate into the storage device. If the deficiency employee number is not fulfilled by the employee at the skill level 2, the employee at the skill level 1 is extracted and stored as the training applicable candidate into the storage device. The extraction is performed like that because it is efficient that the employee training is performed in descendent level order from the skill level 3 nearest to the skill level 4, which is defined as the high level.

If the number of all employees at the skill level 3 is more than the deficiency employee number, for example, employees who perform the job close to the skill field is extracted with the priority based on the information concerning the section name and etc. The skill level equal to or lower than 2 is handled similarly.

Then, the server 3 transmits information concerning the extracted training applicable candidates for each skill field whose company evaluation value is lower than the reference evaluation value (step S17). In response to this, the company A terminal 11 receives and displays on the display device, the information concerning the training applicable candidates (step S19). As a result, the person who is in charge of the employee training and operates the company A terminal 11 can arrange the employee training, easily.

As described above, by this embodiment, the necessity of the skill enhancement for each skill field is represented by the deficiency employee number, for example, based on the designation of the weight value of the skill field based on the company strategy and a current enrollment status of employees who have a high level skill. Therefore, the company can easily implement the measure to enhance the skill. Furthermore, because it is possible to concretely specify employees who have to enhance the skill through the employee training, the company can implement the more concrete measure, easily.

Figure 8:
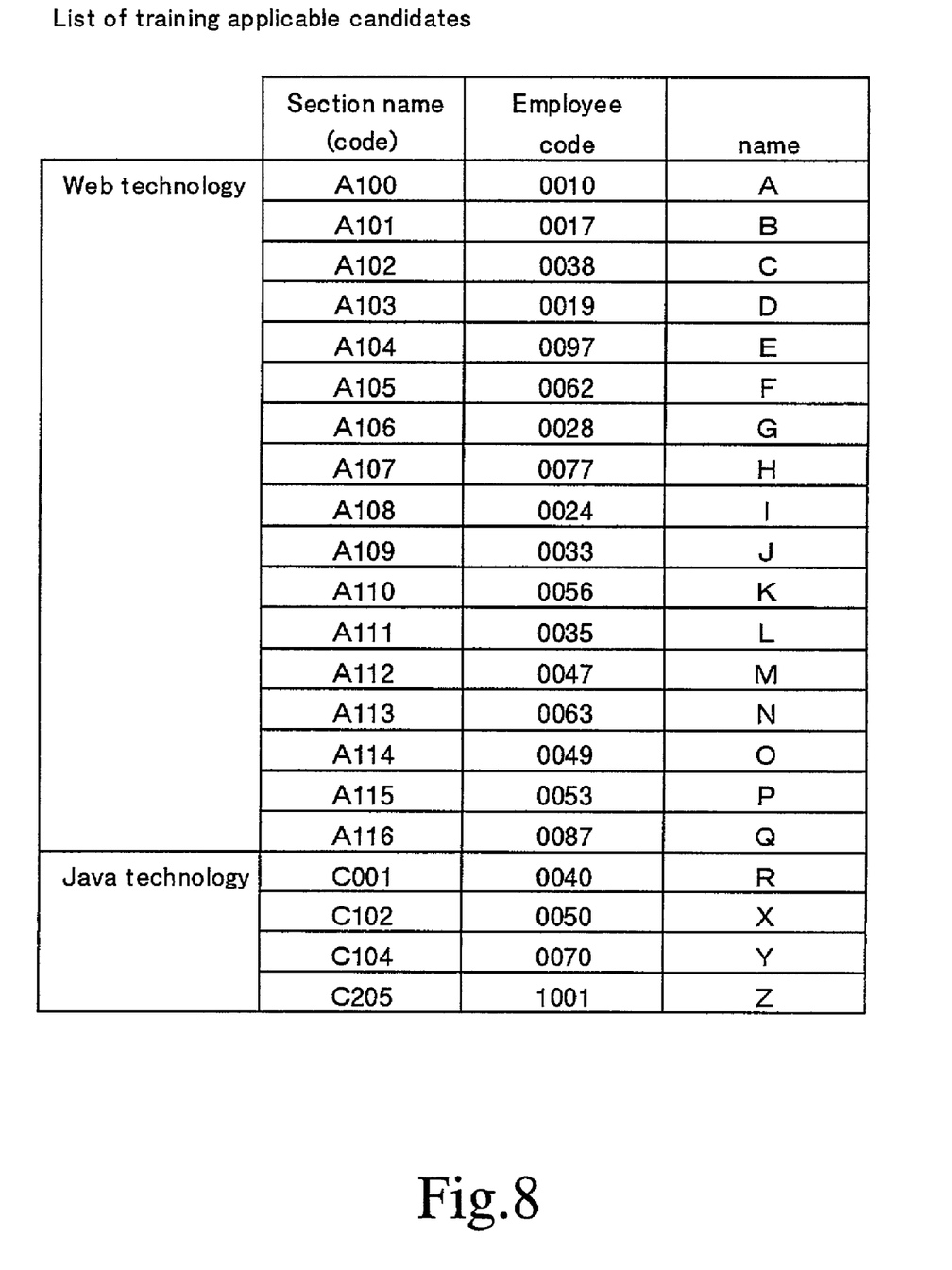
FIG. 8 is a second table used to explain an example.

Here, to make it easy to understand this embodiment, a concrete example is described using FIG. 7 and FIG. 8. In this example, in company A, to which 165 employees belong, the high level employee number is 30 for the web technology, the high level company ratio is 18.2%, and A is designated as its weight. For the security technology, the high level employee number is 24, the high level company ratio is 14.5%, and C is designated as its weight. For the DB technology, the high level employee number is 18, the high level company ratio is 10.9%, and B is designated as its weight. For the UNIX technology, the high level employee number is 28, the high level company ratio is 16.9%, and A is designated as its weight. For the Java technology, the high level company number is 6, its high level company ratio is 3.6%, and B is designated as its weight.

Since A is designated as the weight for the web technology, the comparison object (portion surrounded by a thick line) is the high level company ratio for the top company. In this example, since the high level company ratio for the top company is 28.1%, the difference between the ratio for company A and the ratio of the top company is 9.9%. Therefore, the deficiency employee number is nearly equal to 16.3 (165*0.0099). Then, 17 is determined as the deficiency employee number. If company A can bring up 17 employees to the skill level 4, it becomes the top company in the Web technology field.

Because C is designated as the weight for the security technology, no processing is performed in this embodiment. That is, if weight C is assigned, it is considered that the field is not selected as the field to be trained.

Since B is designated as the weight for the DB technology, the comparison object (portion surrounded by the thick line) is the average value of the high level company ratios for other companies. In this example, the average value of the high level company ratios for other companies is 8.1%, and it is lower than the high level company ratio 10.9% for company A. Therefore, in this embodiment, no processing is performed. That is, the current status represents that the object is achieved and it is better to give high priority to other fields.

Since A is designated as the weight for the UNIX technology, the comparison object (portion surrounded by the thick line) is the high level company ratio for the top company. In this example, however, company A itself is the top company. Therefore, in this embodiment, no processing is performed. That is, the current status represents that the object is achieved and it is better to give high priority to other fields.

Since B is designated as the weight for the Java technology, the comparison object (portion surrounded by the thick line) is the average value of the high level company ratios for other companies. In this example, the average value of the high level company ratios for other companies is 5.8%, and the difference between the ratio of company A and the average value is 2.2%. Therefore, the deficiency employee number is nearly equal to 3.6 (165*0.022). Then, 4 is determined as the deficiency employee number. If company A can bring up 4 employees to the skill level 4, it becomes a company, which holds the average skill in the Java technology field.

Thus, it is necessary for company A to extract 17 training applicable candidates for the web technology, and 4 training applicable candidates for the Java technology. Company A can extract training applicable candidates by using only this information. It is possible to extract candidates by using the employee information DB in company A or recruit employees to each business section. In addition, it is possible to generate a list of the training applicable candidates, for example, shown in FIG. 8 by referring to the each company employee information DB 9. In the example of FIG. 8, for each of two skill fields, the list includes section names (codes), employee codes and names. Because the person who is in charge of the employee training can easily recognize the employee names and sections by this list, he or she can perform preparation including coordination within each section for the employee training and perform the employee training in an early stage.

The above described embodiment is one example and various variations are possible. For example, in the above described embodiment, the number of employees in the skill level 4 and 5 is simply added, and the high level employee number and/or the high level company ratio are calculated. However, it is better to make the ratio of employees at the skill level 5 high. Therefore, if it can be judged that an employee at the skill level 5 is evaluated as two employees at the skill level 4, it is possible to configure this invention to use the high level employee number calculated by 2*(the number of employees at the skill level 5)+ the number of employees at the skill level 4. However, the number "2" is an example, and other value may be used.

Even in a case in which the high level employee number and/or the high level company ratio are calculated in a manner described immediately before, the deficiency employee number is calculated on the assumption of bringing up employees to the skill level 4. This is because it is impossible to immediately bring up employees to the skill level 5. The method of calculating the deficiency employee number is the same as described above.

In addition, in the above described explanation, the high level company ratio is calculated by (the high level employee number)/(the number of all employees). However, the number of all employees includes the number of employees in the staff section, for example, the personnel section, the general affairs section, and the legal section. Therefore, "the number of all employees" may be replaced with the number of employees who belong to sections directly and indirectly relating to the skill fields. For example, if the technical skill fields are used, "number of all employees" may be replaced with the number of employees who have a technical profession. When the deficiency employee number is calculated, "the number of all employees" may be also replaced.

In the above described embodiment, the weight is represented by three stages, that is, A, B, and C. It is possible to define more stages or fewer stages. In addition, a value designated by another method is used for the reference evaluation value.

Furthermore, the system diagram shown in FIG. 1 is one example. The server 3 may be configured by not only one computer, but also a plurality of computers, which perform the above described functions. Information stored in each DB is one example, and more information may be stored in each DB.

In addition, the above described embodiment represents the company terminal requests a processing to the server 3 via network 1 and receives the processing result. However, the online processing is not mandatory. That is, it is possible that information concerning the employee skill is input to the server 3 through a storage medium such as a magnetic tape, and the server 3 performs the above described processing without the transaction with the company terminals (step S3, S13 and S17), and prints out the processing result on, for example, a paper, and delivers it to the requesting company. It is also possible to deliver the processing result by, for example, facsimile, e-mail and etc. Furthermore, it is possible that the person answers the processing result to the requesting company by the telephone.

Furthermore, it is possible to configure the server 3 to perform other processing and provide various kind of information concerning the employee trainings in the companies. As described above, for example, the server 3 may perform, for example, online examinations to judge the skill levels of the employees and may provide the schedule information for the employee trainings.

Programs for performing processing described above are installed, and the programs may be distributed through storage mediums, storage device, or transmission mediums. Intermediate data is stored on a storage device for example, a main memory of the server 3.

As described above, the present invention can provide to provide the technology that enables to plan the employee training based on current skill possession status and the company strategy.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer-implemented method used in a planning of an employee training in a company, said method comprising:
    comparing, with a computer, a company evaluation value determined based on a number of employees in said company who have a skill equal to or higher than a predetermined level in a field selected by said company with a reference evaluation value of said company evaluation value in the selected field;
    upon said company evaluation value being less than said reference evaluation value, calculating, with a computer, a number of employees who need to have a skill equal to or higher than said predetermined level in order to make said company evaluation value equal to or higher than said reference evaluation value, and storing said number of employees in a computer data storage; and
    extracting a training applicable candidate based on said number of employees who need to have a skill equal to or higher than said predetermined level in order to make said company evaluation value equal to or higher than said reference evaluation value.

2. The computer-implemented method set forth in claim 1, wherein said extracting a training applicable candidate comprises extracting a training applicable candidate from employees who have a skill less than said predetermined level and close to said predetermined level.

3. A storage medium for storing a program executable by a computer used in a planning of an employee training in a company, said program comprising:
    comparing a company evaluation value determined based on a number of employees in said company who have a skill equal to or higher than a predetermined level in a field selected by said company with a reference evaluation value of said company evaluation value in the selected field;
    upon said company evaluation value being less than said reference evaluation value, calculating a number of employees who need to have a skill equal to or higher than said predetermined level in order to make said company evaluation value equal to or higher than said reference evaluation value; and
    extracting a training applicable candidate based on said number of employees who need to have a skill equal to or higher than said predetermined level in order to make said company evaluation value equal to or higher than said reference evaluation value.

4. The storage medium set forth in claim 3, wherein said extracting a training applicable candidate comprises extracting a training applicable candidate from employees who have a skill less than said predetermined level and close to said predetermined level.

5. A system used in a planning of an employee training in a company, comprising:
    a unit that compares a company evaluation value determined based on a number of employees in said company who have a skill equal to or higher than a predetermined level in a field selected by said company with a reference evaluation value of said company evaluation value in the selected field;
    a unit that calculates a number of employees who need to have a skill equal to or higher than said predetermined level in order to make said company evaluation value equal to or higher than said reference evaluation value if said company evaluation value is less than said reference evaluation value; and
    an extracting unit that extracts a training applicable candidate based on said number of employees who need to have a skill equal to or higher than said predetermined level in order to make said company evaluation value equal to or higher than said reference evaluation value.

6. The system set forth in claim 5, wherein said extracting unit extracts a training applicable candidate from employees who have a skill lower than said predetermined level and close to said predetermined level.

* * * * *

UNITED STATES PATENT AND TRADEMARK OFFICE
CERTIFICATE OF CORRECTION

PATENT NO. : 7,346,542 B2  
APPLICATION NO. : 09/795311  
DATED : March 18, 2008  
INVENTOR(S) : Hidenori Suzuki It is certified that error appears in the above-identified patent and that said Letters Patent is hereby corrected as shown below:

On the Title Page Item (56) (U.S. PATENT DOCUMENTS), Line 8, after "6,857,877   B1 *   2/2005   Watanabe ..................... 434/219" insert --6,393,406   B1   5/2002   Eder--.

On the Title Page Item (56) (OTHER PUBLICATIONS), Line 2, change "fron" to --from--.

On the Title Page Item (56) (OTHER PUBLICATIONS), Line 9, change "Perfoormance" to --Performance--.

On the Title Page Item (57) (ABSTRACT), Line 10, change "predetermed" to --predetermined--.

Signed and Sealed this

Second Day of September, 2008

JON W. DUDAS  
*Director of the United States Patent and Trademark Office*